(12) United States Patent
Solfa

(10) Patent No.: US 12,421,094 B2
(45) Date of Patent: Sep. 23, 2025

(54) COUNTER-CURRENT DOUBLE-FLOW PASTEURIZER WITH CONDITIONING CONTROL

(71) Applicant: SIDEL PARTICIPATIONS S.A.S., Octeville-sur-Mer (FR)

(72) Inventor: Andrea Solfa, Parma (IT)

(73) Assignee: SIDEL PARTICIPATIONS S.A.S, Octeville-sur-Mer (FR)

( * ) Notice: Subject to any disclaimer, the term of this patent is extended or adjusted under 35 U.S.C. 154(b) by 0 days.

(21) Appl. No.: 18/850,641

(22) PCT Filed: Mar. 23, 2023

(86) PCT No.: PCT/EP2023/057460
§ 371 (c)(1),
(2) Date: Sep. 25, 2024

(87) PCT Pub. No.: WO2023/180441
PCT Pub. Date: Sep. 28, 2023

(65) Prior Publication Data
US 2025/0214824 A1     Jul. 3, 2025

(30) Foreign Application Priority Data
Mar. 25, 2022    (IT) ................... IT102022000005936

(51) Int. Cl.
*B67C 7/00*       (2006.01)
*A23B 2/22*       (2025.01)
*C12H 1/18*       (2006.01)

(52) U.S. Cl.
CPC .............. *B67C 7/0073* (2013.01); *A23B 2/22* (2025.01); *B67C 7/0006* (2013.01); *C12H 1/18* (2013.01);
(Continued)

(58) Field of Classification Search
CPC ................ B67C 7/0073; B67C 7/0006; B67C 2007/006; B67C 2007/0066; B67C 2003/226; B67C 3/045; B67C 3/22
(Continued)

(56) References Cited

U.S. PATENT DOCUMENTS

2002/0159915 A1* 10/2002 Zelina .................... A61L 2/208
                                                                422/305

FOREIGN PATENT DOCUMENTS

EP      1525808 A1 *   4/2005   ............... A23L 3/04
EP      3473109 A1     4/2019
(Continued)

OTHER PUBLICATIONS

International Search Report dated May 8, 2023 for PCT/EP2023/057460.

*Primary Examiner* — Jacob A Smith
(74) *Attorney, Agent, or Firm* — Blake T. Hudson

(57) ABSTRACT

A palletizing device of container packs, being of a sliding table type, including a structure and a loading surface of the packs with side-by-side parallel rollers mounted on mobile frames with a freely rotation, with two side parts movable from a closed position to an opened position, and reversely, wherein when a locking system of the rollers with a locking means with a cart with a locker mobile from a folded position to an unfolded position, and reversely, is in the unfolded position, the locker is blocking the freely rotation of the rollers, and the locking system has a fixed locking actuator cooperating with the locking actuator to move the locker from the folded position to the unfolded position to lock the rollers of the two sides parts during the movement from the closed to the opened position.

10 Claims, 2 Drawing Sheets

(52) U.S. Cl.
CPC .............................. *B67C 2007/006* (2013.01); *B67C 2007/0066* (2013.01)

(58) Field of Classification Search
USPC .................................................. 53/127, 425
See application file for complete search history.

(56) References Cited

FOREIGN PATENT DOCUMENTS

| EP | 3504984 A1 * | 7/2019 | ............. A23L 3/005 |
| EP | 3505456 A1 | 7/2019 | |
| JP | S5352453 U | 5/1978 | |
| KR | 20220010748 A | 1/2022 | |
| WO | 9419968 A1 | 9/1994 | |
| WO | WO9602626 A1 * | 2/1996 | ............... C12H 1/18 |

* cited by examiner

COUNTER-CURRENT DOUBLE-FLOW PASTEURIZER WITH CONDITIONING CONTROL

CROSS-REFERENCE TO RELATED APPLICATIONS

This application is the 35 U.S.C. § 371 national stage of PCT application having Ser. No. PCT/EP2022/054371, filed on 22 Feb. 2022. This application also claims priority to French application having Ser. No. FR2101823 filed on 25 Feb. 2021, each of which are entirely incorporated herein by reference.

This application is a 35 U.S.C. § 371 national stage of PCT application having serial number PCT/EP2023/057460, filed on Mar. 23, 2023, which claims priority to Italian patent application serial number IT102022000005936 filed on Mar. 25, 2022, which are entirely incorporated herein by reference.

The present invention relates to a pasteurizer for pasteurizing containers filled with a pourable product, and to a packaging apparatus comprising the pasteurizer. The pasteurizer can simultaneously treat at least two flows of containers, and may be used to obtain energy savings, a simpler mechanical configuration, a greater uniformity of heat treatment of the two flows, easier integration of the pasteurizer into the apparatus, and greater versatility of the pasteurizer.

In the field of pourable product packaging, it may be necessary, depending on the type of product to be packaged, to pasteurize the product after it has been put into the containers, in order to increase the useful life, commonly called the "shelf life", of the product. Beer is an example of a type of product that may require pasteurization.

There is a type of pasteurizer that comprises a tunnel and is configured for pasteurizing at least two flows of containers passing through the tunnel. The two flows are positioned one above the other. In particular, the pasteurizer is configured to define at least a preheating section, a heating section, a pasteurization section, and a cooling section.

For each of the preheating and cooling sections, the pasteurizer comprises a respective conditioning dispenser, positioned in the respective section for dispensing a respective conditioning liquid towards the upper flow. For each of the preheating and cooling sections, the section comprises a respective upper sub-chamber and a respective lower sub-chamber, in such a way that the lower flow passes through the lower sub-chamber and the upper flow passes through the upper sub-chamber. For each of the preheating and cooling sections, the upper sub-chamber is in fluid communication with the lower sub-chamber, so that the respective conditioning liquid sequentially strikes the upper flow and the lower flow. For each of the preheating and cooling sections, the pasteurizer comprises a respective conditioning collector, positioned in the respective section for collecting the liquid that has struck the upper flow and the lower flow.

The pasteurizer comprises a first recirculation device, for conveying the conditioning liquid from the collector of the cooling section to the dispenser of the preheating section. The pasteurizer comprises a second recirculation device, for conveying the conditioning liquid from the collector of the preheating section to the dispenser of the cooling section.

Thus the heating effect that the containers have on the conditioning liquid of the cooling section may be used to heat the liquid that is to be dispensed by the dispenser of the preheating section. Additionally, the cooling effect that the containers have on the conditioning liquid of the preheating section may be used to cool the liquid that is to be dispensed by the dispenser of the cooling section.

In this type of pasteurizer, the flow rate of the conditioning liquid, for each of these preheating and cooling sections, must not be too low, because the difference in treatment temperature between the upper flow and the lower flow increases as this flow rate decreases. Indeed, since the upper flow is located upstream of the lower flow along the direction of the dispensing of the conditioning liquid, the conditioning liquid, before striking the lower flow, undergoes a heat loss in the case of the preheating section, or a heat gain in the case of the cooling section. Additionally, the requirement for a hydraulic connection between the collector of the cooling section and the dispenser of the preheating section, and between the collector of the preheating section and the dispenser of the cooling section, gives rise to a high degree of mechanical complexity in the pasteurizer.

If the filled containers have to be pasteurized, an apparatus for packaging a pourable product typically comprises a filling and capping unit, a pasteurizer, and a processing machine, such as a labeller, for processing the pasteurized containers.

The tunnel extends longitudinally from a first end to a second end, opposite to the first end, so that the direction of the upper and the lower flow is from the first end to the second end.

The filling and capping unit must be in communication with one end of the tunnel, so as to feed the flows with the containers leaving the filling and capping unit. The labeller must be in communication with the other end, so as to receive both of the flows leaving the pasteurizer. The first end may be considered to be proximal with respect to the filling and capping unit, and distal with respect to the labeller. The second end may be considered to be proximal with respect to the labeller, and distal with respect to the filling and capping unit.

In particular, the filling and capping unit is in communication with the tunnel via a first conveyor system, and the labeller is in communication with the tunnel via a second conveyor system. The first conveyor system comprises a respective first branch for feeding the lower flow, and a second branch for feeding the upper flow. The second conveyor system comprises a respective first branch, enabling the labeller to receive the lower flow leaving the pasteurizer, and a second branch, enabling the labeller to receive the upper flow leaving the pasteurizer.

If the filling and capping unit is in communication with the first end and the labeller is in communication with the second end, the need to feed the upper flow as well requires a degree of extension of both of the second branches, since these second branches must not be excessively inclined. Otherwise, if the filling and capping unit is in communication with the second end and the labeller is in communication with the first end, the extension of all the branches must be considerable. In both cases, a high degree of mechanical complexity is present in the first and second conveyor systems.

Furthermore, it is impossible to switch existing pasteurizers to cooling mode so that they can be used solely for the purpose of cooling the filled containers.

A pasteurizer according to the present description, or according to any of the appended claims for a pasteurizer, is configured to simultaneously pasteurize at least two flows of containers, and, by comparison with the prior art, can provide energy savings, particularly due to a reduced flow rate of the conditioning liquids; has a simpler mechanical configuration than a hydraulic system, since it allows the collector of the cooling system not to be connected to the dispenser of the preheating section, and allows the collector of the preheating section not to be connected to the dispenser of the cooling section, consequently also enabling the pasteurizer to be switched to cooling mode very rapidly, so that the pasteurizer can very rapidly become a cooling machine; can provide greater uniformity of heat treatment of the two flows, because the preheating section of the upper flow corresponds to the cooling section of the lower flow and vice versa, so that the heat transfer between the conditioning liquid and the containers of the upper flow makes a positive contribution to the requisite thermal effect on the containers of the lower flow, for both of these sections; and can provide easier integration of the pasteurizer into the apparatus, since the filling and capping unit and the labeller can each be in communication with the first and the second end of the tunnel.

An apparatus according to the present description, or according to any of the appended claims for an apparatus, comprises a pasteurizer according to the present description, or according to any of the appended claims for an apparatus. An apparatus according to the present description, or according to any of the appended claims for an apparatus, has a lower degree of mechanical complexity than the prior art.

The characteristics of a pasteurizer according to the present description and of an apparatus according to the present description will be apparent from the following detailed description of respective examples of embodiment of such a pasteurizer and apparatus. In the following text, this embodiment of the pasteurizer will be referred to more simply as "the pasteurizer", and this embodiment of the apparatus will be referred to more simply as "the apparatus".

The following detailed description makes reference to the attached drawings, in which.

The pasteurizer 1 is configured for pasteurizing containers which are filled with a pourable product and capped or sealed. The containers may, for example, be bottles or cans. The bottles may, for example, be bottles made of PET or glass. If the containers are cans, the containers are sealed. If the containers are bottles, the containers are capped.

The pasteurizer comprises a tunnel 2. The tunnel 2 comprises, along its longitudinal extension, at least a first section 21 and a second section 22. The first section 21 and the second section 22 are positioned at different heights along or with respect to this longitudinal extension. The pasteurizer 1 is configured to generate a lower flow F1 of containers and an upper flow F2 of containers. The pasteurizer 1 is configured so that the lower flow F1 and the upper flow F2 take place through the tunnel 2 and along the longitudinal extension of the tunnel 2. The pasteurizer 1 is configured to be supported so that the lower flow F1 is positioned below the upper flow F2 with respect to gravity. The pasteurizer 1 is configured so that, in operation, gravity is transverse or orthogonal to the longitudinal extension of the tunnel 2 and to the upper flow F2 and the lower flow F1.

Figure 2:
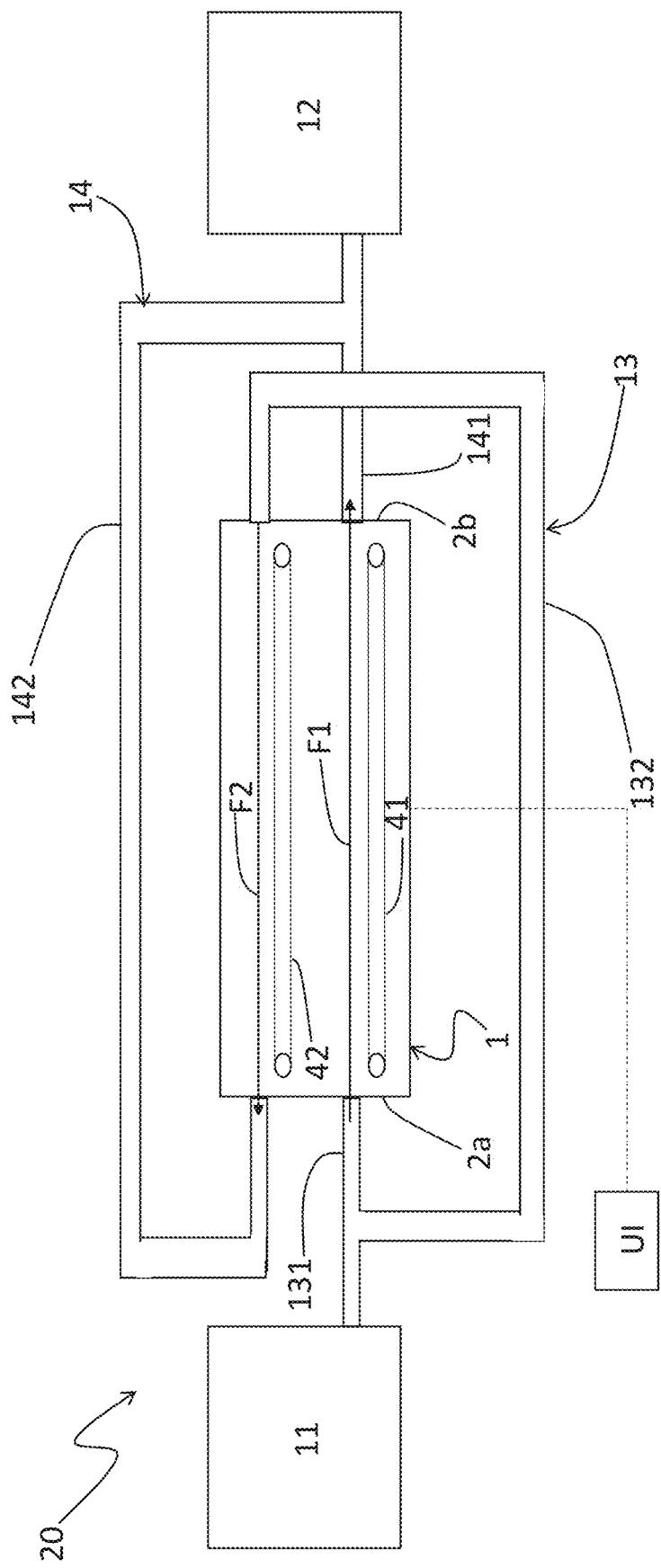
FIG. 2 is a schematic side view of the apparatus, with parts removed for clarity.

The tunnel 2 extends longitudinally from a first end 2a to a second end 2b. The second end 2b is opposite to the first end 2a, so that the direction of the lower flow F1 is from the first end 2a to the second end 2b, and the direction of the upper flow F2 is from the second end 2b to the first end 2a. The pasteurizer 1 comprises a first conveyor 41 for defining the lower flow F1 and a second conveyor 42 for defining the upper flow F2. For the sake of clarity, the conveyors are shown in FIG. 2 only.

The pasteurizer 1 is configured so that the lower flow F1 is longitudinally opposed to the upper flow F2. Therefore the lower flow F1 takes place in a direction which is longitudinally inverted with respect to the upper flow F2. Thus the pasteurizer 1 is at least a double-flow and counter-current pasteurizer 1.

Figure 1:
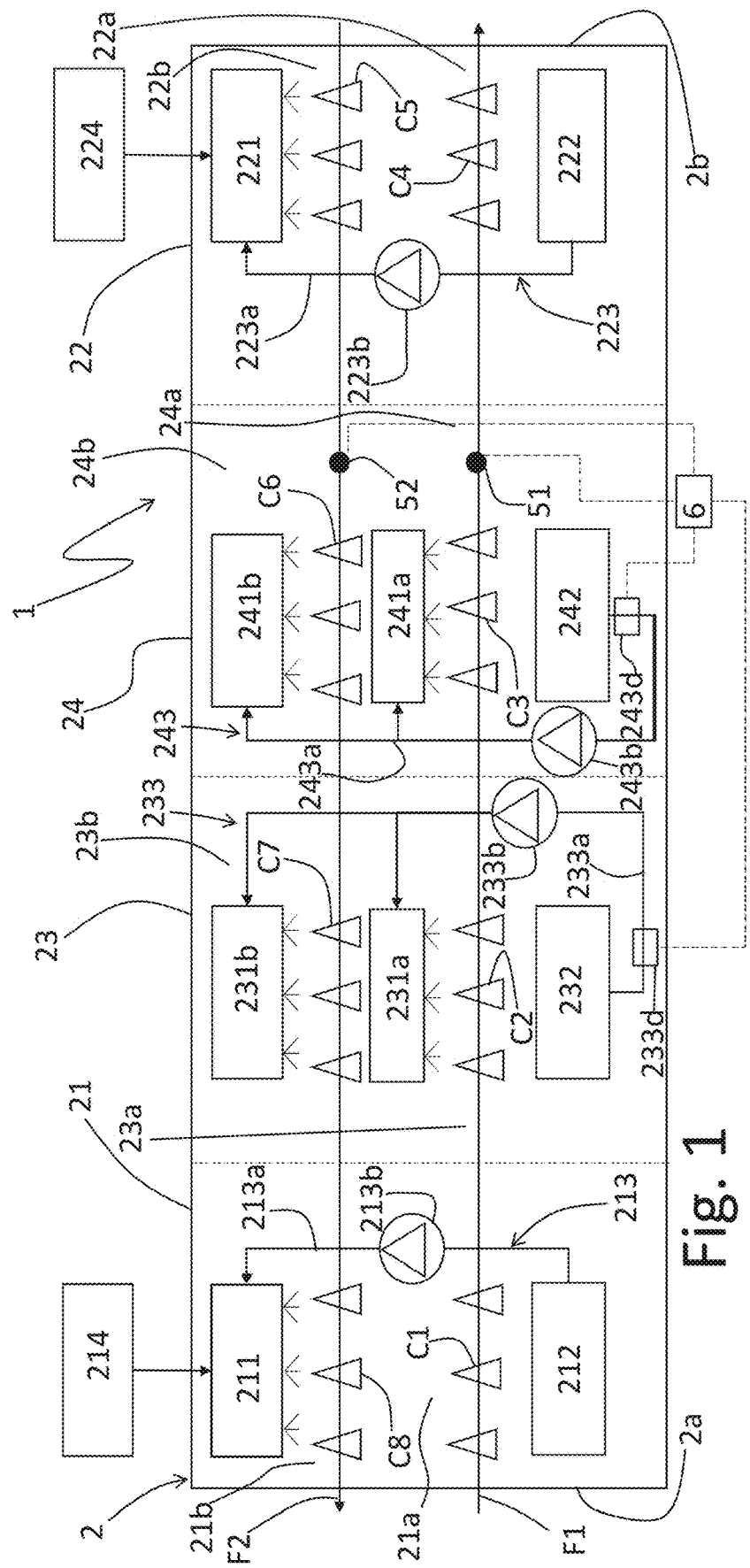
FIG. 1 is a schematic side view of the pasteurizer, with parts removed for clarity.

In FIG. 1, the references C1, C2, C3 and C4 indicate examples of containers belonging to the lower flow F1. In FIG. 1, the references C5, C6, C7 and C8 indicate examples of containers belonging to the upper flow F2.

The pasteurizer 1 is configured so that the first section 21 corresponds to a preheating of the lower flow F1. The pasteurizer 1 is configured so that the first section 21 also corresponds to a cooling of the upper flow F2. In FIG. 1, the container C1 is shown while being subjected to a preheating step in the first section 21. In FIG. 1, the container C8 is shown while being subjected to a cooling step in the first section 21.

The pasteurizer 1 is configured so that the second section 22 corresponds to a cooling of the lower flow F1. The pasteurizer 1 is configured so that the second section 22 also corresponds to a preheating of the upper flow F2.

In FIG. 1, the container C4 is shown while being subjected to a cooling step in the second section 22. In FIG. 1, the container C5 is shown while being subjected to a preheating step in the second section 22.

The tunnel 2 comprises, along its longitudinal extension, at least a third section 23 and a fourth section 24. The third section 23 and the fourth section 24 are positioned longitudinally between the first section 21 and the second section 22. The third section 23 and the fourth section 24 are positioned at different heights along or with respect to this longitudinal extension.

The pasteurizer 1 is configured so that the third section 23 corresponds to a heating of the lower flow F1. The pasteurizer 1 is configured so that the third section 23 also corresponds to a pasteurization of the upper flow F2.

In FIG. 1, the container C2 is shown while being subjected to a heating step in the third section 23. In FIG. 1, the container C7 is shown while being subjected to a pasteurization step in the third section 23.

The pasteurizer 1 is configured so that the fourth section 24 corresponds to a pasteurization of the lower flow F1. The pasteurizer 1 is configured so that the fourth section 24 also corresponds to a heating of the upper flow F2.

In FIG. 1, the container C3 is shown while being subjected to a pasteurization step in the fourth section 24. In FIG. 1, the container C6 is shown while being subjected to a heating step in the fourth section 24.

The pasteurizer 1 is configured so that each container of the first flow F1 passes sequentially through the first section 21, the third section 23, the fourth section 24, and the second section 22. The pasteurizer 1 is configured so that each container of the second flow F2 passes sequentially through the second section 22, the fourth section 24, the third section 23, and the first section 21. Therefore, each container of each of the upper flow F2 and lower flow F1 is subjected sequentially, in the tunnel 2, to a preheating step, to a heating, to a pasteurization step, and to a cooling step. For example, the containers of the first flow F1 enter the first section 21 at a temperature of 5 degrees and leave the first section 21 at a temperature of 35 degrees. The same applies to the containers of the second flow F2 with respect to the second section 22.

For example, the containers of the first flow F1 enter the third section 23 at a temperature of 35 degrees and leave the third section 23 at a temperature of 62 degrees. The same applies to the containers of the second flow F2 with respect to the fourth section 24.

For example, the containers of the first flow F1 enter the fourth section 24 at a temperature of 62 degrees and leave the fourth section at a temperature of 63 degrees. The same applies to the containers of the second flow 22 with respect to the third section 23. Therefore, the pasteurization step may be considered, at least substantially with respect to the other steps, as a step of high temperature heat treatment, suitable for pasteurization.

For example, the containers of the first flow F1 enter the second section 22 at a temperature of 63 degrees and leave the second section 22 at a temperature of 38 degrees. The same applies to the containers of the second flow F2 with respect to the first section 21.

For each of the first section 21 and second section 22, the pasteurizer 1 comprises a respective conditioning dispenser 211 or 221. For each of the first section 21 and second section 22, the conditioning dispenser is positioned in the respective section 21 or 22, for dispensing a respective conditioning liquid towards the upper flow F2.

Each of the first section 21 and second section 22 comprises a respective upper sub-chamber 21b or 22b, and a respective lower sub-chamber 21a or 22b, so that the lower flow F1 passes through the lower sub-chamber 21a or 22a and the upper flow F2 passes through the upper sub-chamber 21b or 22b.

For each of the first section 21 and second section 22, the upper sub-chamber 21b or 22b is in fluid communication with the dispenser 211 or 221, transversely with respect to the longitudinal extension of the tunnel 2.

For each of the first section 21 and second section 22, the upper sub-chamber 21b or 22b is in fluid communication with the lower sub-chamber 21a or 22a, so that the respective conditioning liquid sequentially strikes the upper flow F2 and the lower flow F1. For each of the first section 21 and second section 22, the upper sub-chamber 21b or 22b is in fluid communication with the lower sub-chamber 21a or 22a, transversely with respect to the longitudinal extension of the tunnel 2. For each of the first section 21 and second section 22, the upper sub-chamber 21b or 22b is in fluid communication with the lower sub-chamber 21a or 22a through the second conveyor 42. For each of the first section 21 and second section 22, the second conveyor 42 is configured so that the aforementioned fluid communication is present between the upper sub-chamber 21b or 22b and the lower sub-chamber 21a or 22a. For this purpose, the second conveyor 42 has a plurality of respective openings.

For each of the first section 21 and second section 22, the pasteurizer 1 comprises a respective conditioning collector 212 or 222. For each of the first section 21 and second section 22, the conditioning collector 212 or 222 is positioned in the respective section 21 or 22, for collecting a respective conditioning liquid that has struck the upper flow F2 and the lower flow F1. For each of the first section 21 and second section 22, the lower sub-chamber 21a or 22a is in fluid communication with the conditioning collector 212 or 222, so that the respective conditioning liquid can be collected by the collector 212 or 222 after having struck the lower flow F1. For each of the first section 21 and second section 22, the lower sub-chamber 21a or 22a is in fluid communication with the collector 212 or 222, transversely with respect to the longitudinal extension of the tunnel 2. For each of the first section 21 and second section 22, the lower sub-chamber 21a or 22a is in fluid communication with the collector 212 or 222, through the first conveyor 41. For each of the first section 21 and second section 22, the first conveyor 41 is configured so that the aforementioned fluid communication is present between the lower sub-chamber 21a or 22a and the collector 212 or 222. For this purpose, the first conveyor 41 has a plurality of respective openings. For each of the first section 21 and second section 22, the pasteurizer 1 comprises a recirculation device 213 or 223 for returning the respective liquid from the collector 212 or 222 to the dispenser 211 or 221.

The conditioning liquid dispensed by the dispenser 211 of the first section 21 may be considered to be a cooling liquid for the upper flow F2. When this cooling liquid has exchanged heat with the containers of the upper flow F2, it is heated and becomes a preheating liquid for the containers of the lower flow F1. This preheating liquid for the lower flow F1 is collected by the collector 212 of the first section 21, and is delivered to the dispenser 211 via the recirculation device 213.

The conditioning liquid dispensed by the dispenser 221 of the second section 22 may be considered to be a preheating liquid for the upper flow F2. When this preheating liquid for the upper flow F2 has exchanged heat with the containers of the upper flow F2, it is cooled and becomes a cooling liquid for the containers of the lower flow F1. This cooling liquid for the lower flow F1 is collected by the collector 222 of the second section 22, and is delivered to the dispenser 221 via the recirculation device 223.

Thus the dispenser 211 of the first section 21 may be used so that the first section 21 corresponds to the preheating of the lower flow F1 and to the cooling of the upper flow F2, and the dispenser 221 of the second section 22 may be used so that the second section 22 corresponds to the preheating of the upper flow F2 and to the cooling of the lower flow F1. It is therefore unnecessary to connect the collector of the second section 22 hydraulically to the dispenser of the first section 21, and vice versa; consequently the mechanical complexity of the pasteurizer is decreased, resulting in greater convenience and reliability in the use of the pasteurizer and a lower production cost.

Furthermore, for each of the first section 21 and second section 22, the dispensing flow rate of the dispenser 211 or 221 does not necessarily have to be high in order to reduce the temperature difference in the conditioning liquid associated with the exchange of heat between the conditioning liquid and the upper flow F2. In fact, this temperature difference is helpful in obtaining the desired thermal effect in the same tunnel section and on the other flow of containers. The dispensing flow rate of the dispenser 211 or 221 may therefore be reduced, thereby achieving energy savings. Furthermore, since this temperature difference is beneficial for the desired thermal effect on the other flow, this also improves the uniformity of heat treatment between the two flows F1 and F2.

The result is the production of a double-flow pasteurizer 1 with improved uniformity of heat treatment, which is more efficient, more convenient to use, less costly to produce, less costly to use, and more environmentally friendly. The pasteurizer 1 comprises a user interface UI, which, for the sake of clarity, is shown in FIG. 2 only.

The pasteurizer 1 is configured for operating in pasteurization mode and in cooling mode, and for allowing a user to select the mode by means of the user interface. The configuration of the pasteurizer 1 enables the user to select the mode simply by interacting with the user interface, since no structural or hydraulic modifications are required to change the mode.

For each of the first section 21 and second section 22, the pasteurizer 1 comprises a thermal conditioning unit 214 or 224, for thermally conditioning the respective conditioning liquid. For each of the first section 21 and second section 22, the recirculation device 213 and 223 enables the respective conditioning liquid to be thermally regenerated. Thus, for each of the first section 21 and second section 22, the conditioning unit 214 or 224 could also be used only in an initial step and in a final step of the production cycle.

For each of said first section 21 and second section 22, the respective recirculation device 213 or 223 is positioned in the respective section 21 or 22.

For each of the first section 21 and second section 22, the recirculation device 213 or 223 comprises a respective hydraulic circuit 213a or 223a which hydraulically connects the collector 212 or 222 to the dispenser 211 or 221, and a respective pump 213b or 223b which operates along said circuit 213a or 223a.

The pasteurizer 1 comprises a first heating dispenser 231a, which is positioned in the third section 23 for dispensing a first heating liquid towards said lower flow F1. The pasteurizer 1 comprises a first pasteurization dispenser 241a, which is positioned in the fourth section 24 for dispensing a first pasteurization liquid towards said lower flow F1. The pasteurizer 1 comprises a second heating dispenser 241b, which is positioned in the fourth section 24 for dispensing a second heating liquid towards said upper flow F2. The pasteurizer 1 comprises a second pasteurization dispenser 231b, which is positioned in the third section 23 for dispensing a second pasteurization liquid towards said upper flow F2. The pasteurizer 1 comprises a first further collector 232, which is positioned in the third section 23 for collecting at least the first heating liquid that has struck the lower flow F1 and the second pasteurization liquid that has struck the upper flow F2. The pasteurizer 1 comprises a second further collector 242, which is positioned in the fourth section 24 for collecting at least the first pasteurization liquid that has struck the lower flow and the second heating liquid that has struck the upper flow F2. The pasteurizer 1 comprises a first further recirculation device 233 for returning the liquid collected by the first further collector 232, at least partly from the first further collector 232 to the first heating dispenser 231a, and at least partly from the first further collector 232 to the second pasteurization dispenser 231b. The pasteurizer comprises a second further recirculation device 243, for returning the liquid collected by the second further collector 242, at least partly from the second further collector 242 to the first pasteurization dispenser 241a, and at least partly from the second further collector 242 to the second heating dispenser 241b.

Thus the pasteurizer 1 can carry out the heating and pasteurizing steps on both the lower flow F1 and the upper flow F2.

For each of the third section 23 and fourth section 24, the section 23 or 24 comprises a respective upper sub-chamber 23b or 24b and a respective lower sub-chamber 23a or 24a, so that the lower flow F1 passes through the lower sub-chamber 23a of the third section and the lower sub-chamber 24a of the fourth section 24, and the upper flow F2 passes through the upper sub-chamber 23b of the third section 23 and the upper sub-chamber 24b of the fourth section 24.

The upper sub-chamber 23b of the third section 23 is in fluid communication with the second pasteurization dispenser 231b, transversely with respect to the longitudinal extension of the tunnel 2. The upper sub-chamber 24b of the fourth section 24 is in fluid communication with the second heating dispenser 241b, transversely with respect to the longitudinal extension of the tunnel 2.

The lower sub-chamber 23a of the third section 23 is in fluid communication with the first heating dispenser 231a, transversely with respect to the longitudinal extension of the tunnel 2. The lower sub-chamber 24a of the fourth section 24 is in fluid communication with the first pasteurization dispenser 241a, transversely with respect to the longitudinal extension of the tunnel 2.

The lower sub-chamber 23a of the third section 23 is in fluid communication with the first further collector 232, so that the first heating liquid can be collected by the first further collector 232, after having struck the lower flow F1. The lower sub-chamber 23a of the third section 23 is in fluid communication with the first further collector 232, transversely with respect to the longitudinal extension of the tunnel 2. The lower sub-chamber 23a of the third section 23 is in fluid communication with the first further collector 232, through the first conveyor 41.

The lower sub-chamber 24a of the fourth section 24 is in fluid communication with the second further collector 242, so that the first pasteurization liquid can be collected by the second further collector 242, after having struck the lower flow F1. The lower sub-chamber 24a of the fourth section 24 is in fluid communication with the second further collector 242, transversely with respect to the longitudinal extension of the tunnel 2. The lower sub-chamber 24a of the fourth section 24 is in fluid communication with the second further collector 242, through the first conveyor 41.

The upper sub-chamber 23b of the third section 23 is in fluid communication with the lower sub-chamber 23a of the third section 23, so that the second pasteurization liquid strikes the upper flow F2 and the lower flow F1 sequentially. The upper sub-chamber 24b of the fourth section 24 is in fluid communication with the lower sub-chamber 24a of the fourth section 24, so that the second heating liquid strikes the upper flow F2 and the lower flow F1 sequentially. The upper sub-chamber 24b of the fourth section 24 is in communication with the lower sub-chamber 24a of the third section 24, and the upper sub-chamber 23b of the third section 23 is in communication with the lower sub-chamber 23a of the fourth section 23, transversely with respect to the longitudinal extension of the tunnel 2.

Thus the first further collector 232 can also collect the second pasteurization liquid delivered from the second pasteurization dispenser 231b, and the second further collector 242 can also collect the second heating liquid delivered from the second heating dispenser 241b.

The upper sub-chamber 23b of the third section 23 could be in direct fluid communication with the first further collector 232, so that the second pasteurization liquid would be conveyed directly to the first further collector 232. The upper sub-chamber 24b of the fourth section 24 could be in direct fluid communication with the second further collector 242, so that the second heating liquid would be conveyed directly to the second further collector 242.

The first further recirculation device 233 comprises a first further hydraulic circuit 233a, which hydraulically connects the first further collector 232 to the first heating dispenser 231a and to the second pasteurization dispenser 231b, to cause the liquid collected by the first further collector 232 to flow along the first further hydraulic circuit 233a. The first further recirculation device 233 comprises a first pumping system 233b, which operates along the first further circuit 233a, so as to perform a pumping action on the liquid collected by the first further collector 232. The second further recirculation device 243 comprises a second further hydraulic circuit 243a, which hydraulically connects the second further collector 242 to the first pasteurization dispenser 241a and to the second pasteurization dispenser 241b, to cause the liquid collected by the second further collector 242 to flow along the second further hydraulic circuit 243a. The second further recirculation device 243 comprises a second further pumping system 243b, which operates along said second further circuit 243a, so as to perform a pumping action on the liquid collected by the second further collector 242.

The first further recirculation device 233 comprises a first thermal conditioning system 233d, which operates along the first further hydraulic circuit 233a so as to thermally condition the liquid flowing along the first further hydraulic circuit 233a. The second further recirculation device 243 comprises a second thermal conditioning system 243d, which operates along the second further hydraulic circuit 243a so as to thermally condition the liquid flowing along the second further hydraulic circuit 243a.

The control unit 6 is configured so that the heating action of the first thermal conditioning system 233d and/or of the second thermal conditioning system 243d automatically depends on at least one value from between the value of the velocity of the lower flow F1 and/or the value of the velocity of the upper flow F2. Thus the temperature of the liquid collected by the first further collector 232 may be modified along the first further hydraulic circuit 233a, so as to regulate the thermal effect of the second pasteurization liquid on the upper flow F2 and/or the thermal effect of the first heating liquid on the lower flow F1. Therefore, the temperature of the second pasteurization liquid may vary as a function of, for example, the velocity value of the upper flow F2, so that, if the velocity of the upper flow F2 is too low, it is possible to avoid and/or reduce the risk of overheating the containers in the upper flow F2, located in the third section 23.

Similarly, the temperature of the liquid collected by the second further collector 242 may be modified along the second further hydraulic circuit 243a, so as to regulate the thermal effect of the second heating liquid on the upper flow F2 and/or the thermal effect of the first pasteurization liquid on the lower flow F1. The temperature of the first pasteurization liquid may therefore vary as a function of, for example, the velocity value of the lower flow F1, so that, if the velocity of the lower flow F1 is too low, it is possible to avoid and/or reduce the risk of overheating the containers in the lower flow F1, located in the fourth section 24.

Said at least one value could comprise the velocity value of the upper flow F2 and the velocity value of the lower flow F1.

The control unit 6 is configured so that, if said at least one value is below a specified threshold, at least one from between the heating action of the first thermal conditioning system 233d and/or the heating action of the second thermal conditioning system 243d is less than it would be in the case in which said at least one value is above said specified threshold. The control unit 6 could possibly be configured so that, if the velocity value of the lower flow F1 is below a specified threshold, the heating action of the second thermal conditioning system 243d is less than it would be in the case in which said velocity value of the lower flow F1 is above said specified threshold.

The control unit 6 could possibly be configured so that, if the velocity value of the upper flow F2 is below a specified threshold, the heating action of the first thermal conditioning system 233d is less than it would be in the case in which said velocity value of the upper flow F2 is above said specified threshold.

Thus, if at least one from between the upper flow F2 and the lower flow F1 decelerates excessively for any reason, the risk of overheating the containers located in the pasteurization area is reduced, since the temperature of the second pasteurization liquid and/or of the first pasteurization liquid is lowered. The temperature of the second pasteurization liquid is also lowered as a result of the fact that the containers of the lower flow F1 contribute to the absorption of heat from the first heating liquid. The temperature of the first pasteurization liquid is also lowered as a result of the fact that the containers of the upper flow F2 contribute to the absorption of heat from the second heating liquid.

The control unit 6 could be configured so that said at least one heating action is zero if said at least one value is zero.

The control unit 6 could possibly be configured so that, if the velocity value of the lower flow F1 is zero, the heating action of the second thermal conditioning system 243d is zero.

The control unit 6 could possibly be configured so that, if the velocity value of the upper flow F2 is zero, the heating action of the first thermal conditioning system 233d is zero.

The pasteurizer 1 comprises at least one sensor. Said at least one sensor is associated with at least one of said conveyors 41 and 42, for detecting at least one velocity value. The pasteurizer 1 comprises an automatic control unit 6. The automatic control unit 6 is in communication with said at least one sensor and with said first thermal conditioning system 233d and second thermal conditioning system 243d. Said at least one sensor could comprise a first sensor 51, associated with the first conveyor 41 for detecting the velocity of the lower flow F1. Said at least one sensor could comprise a second sensor 52, associated with the second conveyor 42 for detecting the velocity of the upper flow F2.

The pasteurizer 1 comprises a user interface UI, which, for the sake of clarity, is shown in FIG. 2 only.

The pasteurizer 1 is configured for operating in pasteurization mode and in cooling mode, and for allowing a user to select the mode by means of the user interface. The configuration of the pasteurizer 1 enables the user to select the mode simply by interacting with the user interface, since no structural or hydraulic modifications are required to change the mode.

The expression "cooling mode" is taken to mean a mode such that the aforementioned steps of preheating, heating and pasteurization are not executed. The expression "pasteurization mode" is taken to mean a mode such that at least the aforesaid steps of preheating, heating, pasteurization and cooling are executed. In cooling mode, each of the hydraulic components of the various sections may be used for the purpose of cooling. Even in cooling mode, the pasteurizer could still be configured to execute a pasteurization step.

The apparatus 20 comprises a filling and closing unit 11 for filling the containers with the product, and for capping the filled containers. The expression "filling and closing unit" is taken to mean a machine configured for filling the containers and for closing the containers. Therefore, if the containers are cans, this machine configured for filling the containers and for closing the containers could comprise a filler and a seamer. If the containers are bottles, this machine configured for filling the containers and for closing the containers could comprise a filler and a capper.

The apparatus 20 comprises the pasteurizer 1. The apparatus 20 comprises a processing machine 12 for processing the pasteurized containers. The processing machine may be, for example, a labeller 12 for labelling the pasteurized containers. The filling and capping unit 11 is in communication with the first end 2a, to feed the lower flow F1 with the containers leaving the filling and capping unit 11. The filling and capping unit 11 is in communication with the second end 2b, to feed the upper flow F2 with the containers leaving the filling and capping unit 11.

The labeller 12 is in communication with the second end 2b, to receive the lower flow F1 leaving the pasteurizer 1. The labeller 12 is in communication with the first end 2a, to receive the upper flow F2 leaving the pasteurizer 1. Thus the pasteurizer 1, which is at least a double-flow pasteurizer with the flows in counter current, may be used efficiently in the environment of the apparatus 20.

The first end 2a is proximal with respect to the filling and capping unit 11 and distal with respect to the labeller 12. In particular, the first end 2a faces towards the filling and capping unit 11, and faces away from the labeller 12. The second end 2b is proximal with respect to the labeller 12 and distal with respect to the filling and capping unit 11. In particular, the second end 2b faces towards the labeller 12, and faces away from the filling and capping unit 11.

The apparatus 20 comprises a first conveyor system 13. The first conveyor system 13 puts the filling and capping unit 11 into communication with the first end 2a and the second end 2b. The apparatus 20 comprises a second conveyor system 14. The second conveyor system 14 puts the labeller 12 into communication with the first end 2a and the second end 2b.

The first conveyor system 13 comprises a respective first branch 131, which conveys the lower flow F1 from the unit 11 to the first end 2a. The first conveyor system 13 comprises a respective second branch 132, which conveys the upper flow F2 from the unit 11 to the second end 2b. The second conveyor system 14 comprises a respective first branch 141, which conveys the lower flow F1 from the second end 2b to the labeller 12. The second end conveyor system 14 comprises a respective second branch 142, which conveys the upper flow F2 from the first end 2a to the labeller 12.

Thus, because of the fact that the flows of the pasteurizer 1 are in counter current, that is to say longitudinally opposed to each other, the double-flow configuration of the pasteurizer, with two flows, one above the other, only requires a dedicated structure for connecting the unit 11 to the second end 2b and the processing machine 12 to the first end 2a. No other complicated structure is required to compensate for the maximum limit of inclination of the branches of the conveyor system, or to connect each of the unit 11 and labeller 12 only to the respective distal end 2b or 2a. Consequently, the apparatus 20 comprises a double-flow pasteurizer 1 having a less complicated structure, greater convenience of use and lower production cost.

The pasteurizer is a double-flow counter current pasteurizer equipped with automatic conditioning control for the automatic regulation of the pasteurization and/or heating steps in accordance with the velocity of the flows. Using this pasteurizer reduces the risk of overheating the containers, if the velocity of the flows is too low for any reason.

The invention claimed is:

1. A pasteurizer (1) for containers which are filled with a pourable product and closed, comprising:
a tunnel (2) comprising, along its longitudinal extension, at least a first section (21) and a second section (22), which are at different heights along said extension, the pasteurizer being configured for generating a lower flow (F1) of containers (C1, C2, C3, C4) and an upper flow (F2) of containers (C5, C6, C7, C8), through the tunnel (2) and along said longitudinal extension, so that the lower flow (F1) is positioned under the upper flow (F2) and the lower flow (F1) is longitudinally contrary with respect to the upper flow (F2);
wherein the pasteurizer (1) is configured so that the first section (21) corresponds to a preheating of the lower flow (F1) and to a cooling of the upper flow (F2), and so that the second section (22) corresponds to a cooling of the lower flow (F1) and to a preheating of the upper flow (F2);
wherein, for each of said first section (21) and second section (22):
the pasteurizer (1) comprises a respective conditioning dispenser (211; 221), positioned in the respective section (21; 22) for dispensing a respective conditioning liquid towards said upper flow (F2);
the section (21; 22) comprises a respective lower sub-chamber (21a; 22a) and a respective upper sub-chamber (21b, 22b), so that the lower flow (F1) passes through the lower sub-chamber (21a; 22a) and the upper flow (F2) passes through the upper sub-chamber (21b; 22b);
the upper sub-chamber (21b; 22b) is in fluid communication with the lower sub-chamber (21a; 22a), so that the respective conditioning liquid strikes sequentially the upper flow (F2) and the lower flow (F1);
the pasteurizer (1) comprises a respective conditioning collector (212; 222), positioned in the respective section (21; 22) for collecting the conditioning liquid which has struck the upper flow (F2) and the lower flow (F1);
the pasteurizer (1) comprises a recirculating device (213, 223) for bringing back the respective conditioning liquid from the collector (212; 222) to the dispenser (211; 221);
wherein, for each of said first section (21) and second section (22), the respective recirculating device (213; 223) is positioned in the respective section (21; 22);
wherein, for each of said first section (21) and second section (22), the recirculating device (213; 223) comprises a respective hydraulic circuit (213a; 223a) which hydraulically connects the collector (212; 222) with the dispenser (211; 221), and a respective pump (213b; 223b) which is operative along the circuit (213a; 223a);
wherein the tunnel (2) comprises, along its longitudinal extension, at least a third section (23) and a fourth section (24), said third section (23) and fourth section (24) being longitudinally positioned between said first section (21) and second section (22);
wherein the pasteurizer (1) is configured so that the third section (23) corresponds to a heating of the lower flow (F1) and to a pasteurization of the upper flow (F2), and so that the fourth section (24) corresponds to a pasteurization of the lower flow (F1) and to a heating of the upper flow (F2);
wherein the pasteurizer comprises:
a first heating dispenser (231a), positioned in the third section (23) for dispensing a first heating liquid towards said lower flow (F1);
a first pasteurization dispenser (241a), positioned in the fourth section (24) for dispensing a first pasteurization liquid towards said lower flow (F1);
a second heating dispenser (241b), positioned in the fourth section (24) for dispensing a second heating liquid towards said upper flow (F2);

a second pasteurization dispenser (231b), positioned in the third section (23) for dispensing a second pasteurization liquid towards said upper flow (F2);

a first further collector (232), positioned in the third section (23), for collecting at least the first heating liquid that has struck the lower flow (F1) and the second pasteurization liquid that has struck the upper flow (F2);

a second further collector (242), positioned in the fourth section (24), for collecting at least the first pasteurization liquid that has struck the lower flow (F1) and the second heating liquid that has struck the upper flow (F2);

a first further recirculating device (233) for bringing back the liquid collected by the first further collector (232), at least in part from the first further collector (232) to the first heating dispenser (231a), and at least in part from the first further collector (232) to the second pasteurization dispenser (231b);

a second further recirculation device (243), for returning the liquid collected by the second further collector (242), at least partly from the second further collector (242) to the first pasteurization dispenser (241a), and at least partly from the second further collector (242) to the second heating dispenser (241b);

wherein the first further recirculating device (233) comprises:
  a first further hydraulic circuit (233a), which hydraulically connects the first further collector (232) to the first heating dispenser (231a) and to the second pasteurization dispenser (231b), to cause the liquid collected by the first further collector (232) to flow;
  a first pumping system (233b), which operates along said first further circuit (233a), so as to perform a pumping action on the liquid collected by the first further collector (232);

wherein the second further recirculating device (243) comprises:
  a second further hydraulic circuit (243a), which hydraulically connects the first further collector (242) to the first pasteurization dispenser (241a) and to the second heating dispenser (241b), to cause the liquid collected by the second further collector (242) to flow;
  a second pumping system (243b), which operates along said second further circuit (243a), so as to perform a pumping action on the liquid collected by the second further collector (242);

wherein the first further recirculating device (233) comprises a first thermal conditioning system (233d), which operates along the first further hydraulic circuit (233a) so as to thermally condition the liquid flowing along the first further hydraulic circuit (233a);

wherein the second further recirculating device (243) comprises a second thermal conditioning system (243d), which operates along the second further hydraulic circuit (243a) so as to thermally condition the liquid flowing along the second further hydraulic circuit (243a);

wherein the pasteurizer is configured so that at least one heating action from between the first thermal conditioning system (233d) and/or the second thermal conditioning system (243d) automatically depends on at least one value from between the velocity value of the lower flow (F1) and/or the velocity value of the upper flow (F2).

2. The pasteurizer according to claim 1, wherein the pasteurizer (1) is configured so that, if said at least one value is below a specified threshold, said at least one heating action is less than it would be in the case in which said at least one value is above said specified threshold.

3. The pasteurizer according to claim 1, wherein the pasteurizer (1) is configured so that said at least one heating action is zero if said at least one value is zero.

4. The pasteurizer (1) according to claim 1, wherein, for each of said third section (23) and fourth section (24), the section (23; 24) comprises a respective upper sub-chamber (23b; 24b) and a respective lower sub-chamber (23a; 24a), so that the lower flow (F1) passes through the lower sub-chamber (23a) of the third section and the lower sub-chamber (24a) of the fourth section (24), and the upper flow (F2) passes through the upper sub-chamber (23b) of the third section (23) and the upper sub-chamber (24b) of the fourth section (24);
  wherein the upper sub-chamber (23b) of the third section (23) is in fluid communication with the lower sub-chamber (23a) of the third section (23), so that the second pasteurization liquid strikes the upper flow (F2) and the lower flow (F1) sequentially;
  and wherein the upper sub-chamber (24b) of the fourth section (24) is in fluid communication with the lower sub-chamber (24a) of the fourth section (24), so that the second heating liquid strikes the upper flow (F2) and the lower flow (F1) sequentially.

5. The pasteurizer (1) according to claim 1, comprising a user interface (UI), the pasteurizer (1) being configured for operating selectively in a pasteurizing mode or in a cooling mode, and for allowing a user to select the mode only by interacting by means of the interface (UI).

6. The pasteurizer (1) according to claim 1, wherein:
  the tunnel (2) longitudinally extends from a first end (2a) to a second end (2b), said second end (2b) being opposite to the first end (2a), so that the direction of the lower flow (F1) is from the first end (2a) to the second end (2b) and the direction of the upper flow (F2) is from the second end (2b) to the first end (2a);
  the pasteurizer (1) comprises a first conveyor (41) for defining the lower flow (F1) and a second conveyor (42) for defining the upper flow (F2);
  the pasteurizer (1) comprises at least one sensor (51; 52) associated with at least one of said conveyors (41, 42), for detecting said at least one velocity value, and an automatic control unit (6) which is in communication with said at least one sensor (51; 52) and said thermal conditioning systems (233d, 243d).

7. An apparatus (20) for packaging a pourable product by means of containers, comprising:
  a filling and closing unit (11) for filling the containers with the product, and for closing the filled containers;
  a pasteurizer for pasteurizing the filled and closed containers, the pasteurizer (1) being according to claim 6;
  a processing machine (12) for processing the pasteurized containers, wherein:
  the filling and closing unit (11) is in communication with the first end (2a), to feed the lower flow (F1) with the containers in output from the filling and closing unit (11);
  the filling and closing unit (11) is in communication with the second end (2b), to feed the upper flow (F2) with the containers in output from the filling and closing unit (11);

the processing machine (12) is in communication with the second end (2b), to receive the lower flow (F1) in output from the pasteurizer (1);

the processing machine (12) is in communication with the first end (2a), to receive the upper flow (F2) in output from the pasteurizer (1).

8. An apparatus (20) according to claim 7, wherein:

the first end (2a) is proximal with respect to the filling and closing unit (11) and distal with respect to the processing machine (12);

the second end (2b) is proximal with respect to the processing machine (12) and distal with respect to the filling and closing unit (11).

9. An apparatus (20) according to claim 8, comprising:

a first conveying system (13) for putting in communication the filling and closing unit (11) with said ends (2a, 2b);

a second conveying system (14) for putting in communication the processing machine (12) with said ends (2a, 2b);

wherein the first conveying system (13) comprises a first branch (131) for conveying the lower flow (F1) from the unit (11) to the first end (2a), and a second branch (132) for conveying the upper flow (F2) from the unit (11) to the second end (2b);

wherein the second conveying system (14) comprises a first branch (141) for conveying the lower flow (F1) from the second end (2b) to the processing machine (12), and a second branch (142) for conveying the upper flow (F2) from the first end (2a) to the processing machine (12).

10. An apparatus (20) according to claim 7, wherein the processing machine (12) comprises a labeller for labelling the pasteurized containers.

* * * * *